United States Patent
Iwakura

(10) Patent No.: US 7,267,263 B2
(45) Date of Patent: Sep. 11, 2007

(54) FOREIGN CURRENCY CONVERSION SYSTEM

(76) Inventor: Mieko Iwakura, #703, 4-3-1 Ebara, Shinagawa-ku, Tokyo (JP)

(*) Notice: Subject to any disclaimer, the term of this patent is extended or adjusted under 35 U.S.C. 154(b) by 41 days.

(21) Appl. No.: 11/262,095

(22) Filed: Oct. 28, 2005

(65) Prior Publication Data

US 2007/0095893 A1     May 3, 2007

(51) Int. Cl.
  G06Q 40/00    (2006.01)
  G07D 11/00    (2006.01)
  G07F 19/00    (2006.01)
(52) U.S. Cl. ......................... 235/379; 705/39
(58) Field of Classification Search ................ 235/379, 235/380; 705/39, 41
See application file for complete search history.

(56) References Cited

U.S. PATENT DOCUMENTS

| | | | | |
|---|---|---|---|---|
| 4,664,417 A | * | 5/1987 | Rosenstrach et al. | 283/116 |
| 4,766,293 A | * | 8/1988 | Boston | 705/41 |
| 4,837,422 A | * | 6/1989 | Dethloff et al. | 235/380 |
| 6,390,366 B1 | * | 5/2002 | Heidenreich et al. | 235/384 |
| 6,659,259 B2 | * | 12/2003 | Knox et al. | 194/217 |
| 6,988,078 B1 | * | 1/2006 | Heidenreich et al. | 705/22 |
| 2005/0096986 A1 | * | 5/2005 | Taylor et al. | 705/16 |
| 2005/0116028 A1 | * | 6/2005 | Cohen et al. | 235/380 |
| 2005/0154674 A1 | * | 7/2005 | Nicholls et al. | 705/43 |

FOREIGN PATENT DOCUMENTS

| | | | |
|---|---|---|---|
| EP | 1251470 A2 | * | 10/2002 |
| JP | 2000099811 A | * | 4/2000 |
| JP | 2000200377 A | * | 7/2000 |
| JP | 2006195660 A | * | 7/2006 |

* cited by examiner

Primary Examiner—Uyen-Chau N. Le
(74) Attorney, Agent, or Firm—Jordan and Hamburg LLP

(57) ABSTRACT

In the foreign currency conversion system of the present invention a foreign currency delivered by, for example, a mailing, home delivery or delivery service in a condition that the foreign currency is put in a storage body such as an envelope, case or box a specific card such as a magnetic card, IC card and the like is issued which saves points that correspond to the amount of the foreign currency calculated according to a conversion rate at the foreign currency at a predetermined period; and a conversion shop is provided which has a conversion-clearing system, which enables purchase of a gift certificate and commercial goods and conversion depending on the points saved in the specific card.

3 Claims, 3 Drawing Sheets

FIG. 3

Duplicate at system management for foreign currency conversion

3B — Duplicate at system management for foreign currency conversion

8 — Add: ○○○○  Name: □□□□

9 — Password

User Agreement

3A — User Agreement

8 — Add: ○○○○  Name: □□□□

9 — Password

3 —

Add: ○○○○  Name: □□□□

Canversion System Management

FOREIGN CURRENCY CONVERSION SYSTEM

BACKGROUND OF THE INVENTION

This invention relates to a system for converting and maintaining foreign currency to IC cards, magnetic cards (pre-paid card) and the like.

In the conventional system, the conversion of foreign currency money was not performed, and it is not available to convert the foreign currency money.

Until now, when the travelers comes back from the foreign countries, there is no system for converting the foreign currency money, and the foreign currency money is not utilized.

Moreover, there is a problem that the system in the financial institution and other conversion system as the conversion of the foreign currency money is not functioned.

SUMMARY OF THE INVENTION

Accordingly, it is an object of the present invention to provide a conversion system of foreign currency money which records value information for conversion and user's information on specific cards including IC cards, magnetic cards (Prepaid-card) and the like and can convert to gift cards and money that can be used by the specific card domestically and buy the commercial goods.

The present invention is understood to encompass embodiments which include all or only a portion of the above objects, features and advantages which, unless recited in claims defining the invention, are understood not to limit interpretation of such claims. The above, and other objects, features and advantages of the present invention will become apparent from the following description read in conjunction with the accompanying drawings, in which like reference numerals designate the same elements.

It is to be expressly understood, however, that the drawings are for the purpose of illustration and description only, and are not intended as a definition of the limits of the invention.

BRIEF DESCRIPTION OF THE DRAWINGS

FIG. 3 is an explanation view of an envelope that lies a system.

DETAILED DESCRIPTION OF PREFERRED EMBODIMENTS

Preferred embodiments of the present invention are described in more detail below referring to the accompanying drawings.

Figure 1:
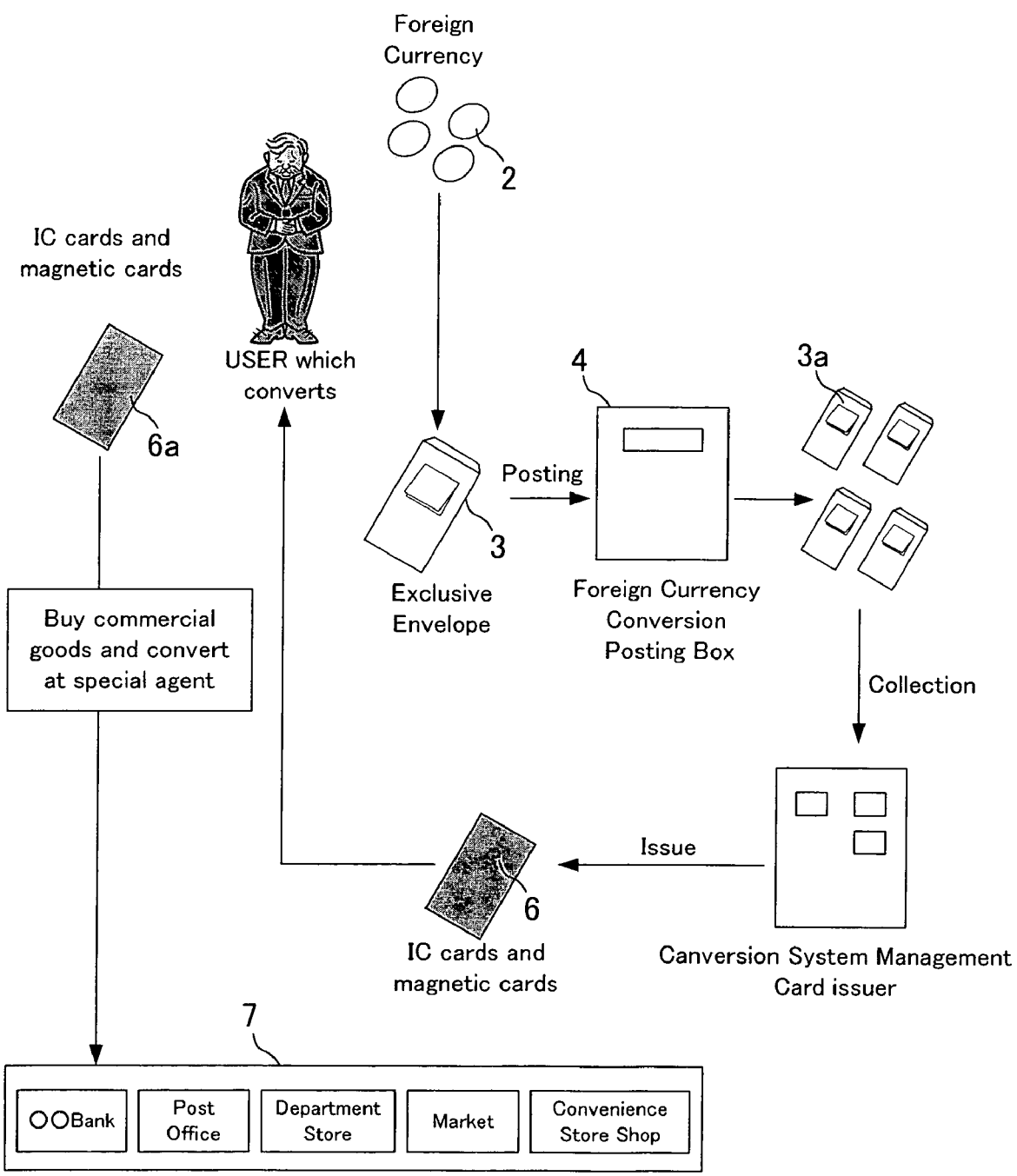
FIG. 1 is an explanation view of a system that lies in the execution form.

An understanding of the present invention may be best gained by reference FIG. 1, and the structure of the conversion system of the foreign currency is shown.

When the person converts money, money is turned on to the exclusive envelope for the foreign currency conversion, and it posts it to the foreign currency conversion posting box.

The money conversion system management and the card issue place collect the envelope only for the posted above-mentioned foreign currency conversion.

Money records conversion value information and those who realize information in IC card and the magnetic card, and is sent back by recycling of the envelope only for the foreign currency conversion by the user who converts.

The person converts by the above-mentioned conversion and receives the IC card and the magnetic card can exchange for the gift certificate, buy the commodity and convert the foreign currency at the bank, the post office, the convenience store, and the department store, etc., as the special agents.

Figure 2:
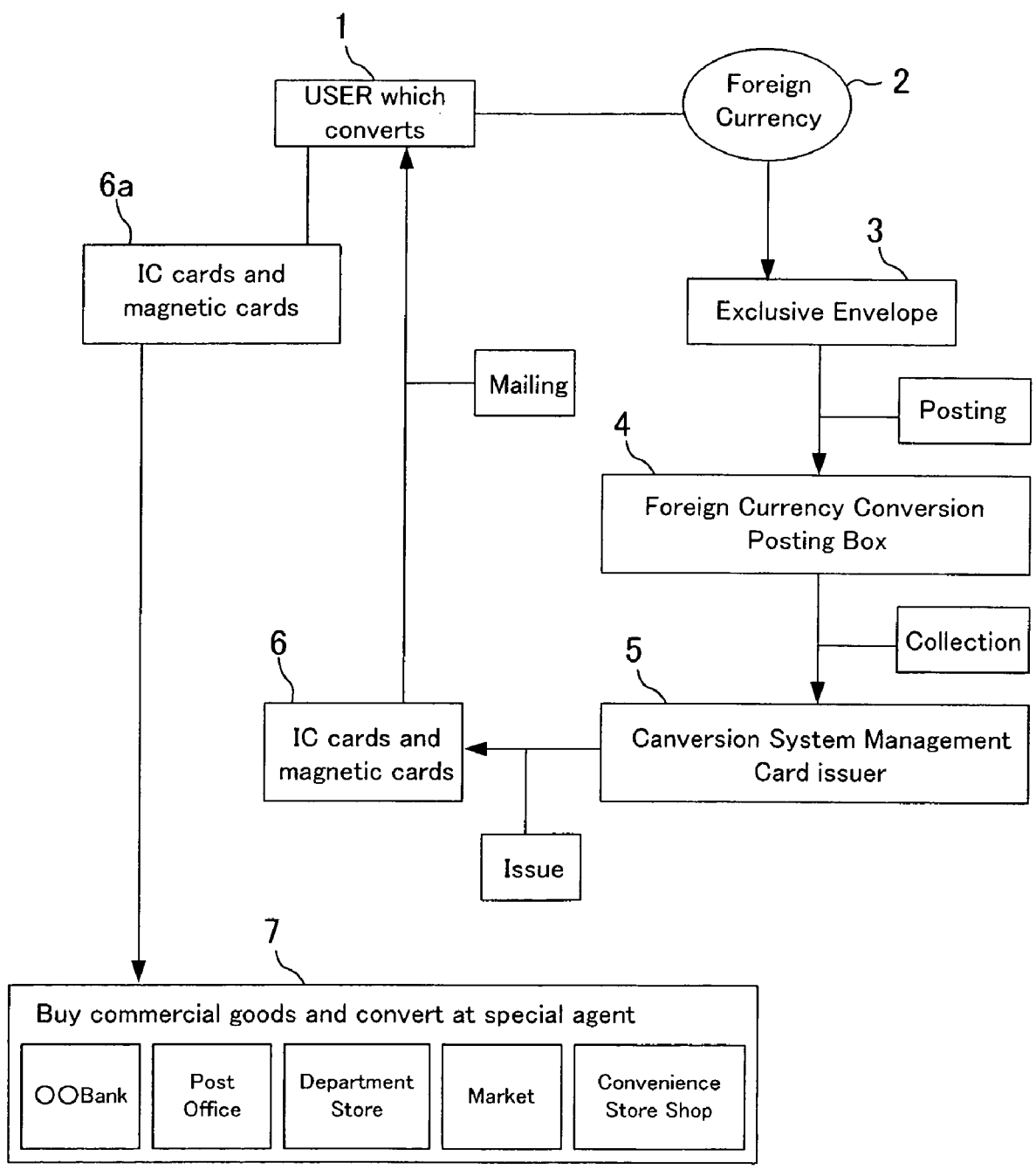
FIG. 2 is a chart of the system that lies in the execution form.

FIG. 2 illustrates a chart that the system in the execution described in FIG. 1.

FIG. 3 illustrates the details of the exclusive envelope for the foreign currency conversion described in FIGS. 1 and 2, and such envelope for the foreign currency conversion is used for tuning on money, posting, collecting and sending IC card and the magnetic card to the user.

The exclusive envelope for the foreign currency conversion includes two manifold paper including a paper at the user record and a paper at system management for the foreign currency conversion, the papers having the address and name filling column, and a password number filling column on the surface of the papers thereof.

The user fills in necessary information on the address-name filling column of the paper at the user record and paper at system management for the foreign currency conversion on the surface of the envelope body for the foreign currency conversion and fills in the arbitrary password number that the user selects.

The user set selectively the password number as security in use and mailing of IC card and magnetic card.

After that, the use keeps paper at the user record after the user fills the necessary information and the password number to the envelope for the foreign currency conversion, and the envelope with paper at system management for the foreign currency conversion and foreign currency that the user want to convert is posted to the foreign currency conversion posting box.

Information filled at the paper at system management for the foreign currency conversion of the envelope posted to the foreign currency conversion posting box, value information of the foreign currency money and password number information are recorded in IC card and the magnetic card.

IC card and the magnetic card input information is transmitted to the user with the recycled envelope for the foreign currency conversion by copying information of the address-name filling column of the envelope.

When the foreign currency is converted again, the user encloses specific cards including IC cards and magnetic cards that are converted and maintained previously with the foreign currency money into the envelope, and the information for the conversion is recorded to the specific card.

As set forth above, the advantages of the invention are as follows:

(1) The conversion system for the foreign currency money can record information for value of the conversion of the currency and the users in the IC cards, magnetic cards including prepaid card and the like.

Therefore, it can provide the system to convert to gift cards and money that can be used by the specific card domestically and buy the commercial goods.

(2) When the travelers come back from the foreign countries, there is no system for converting the foreign currency money, and the foreign currency money is not utilized in the conventional system. Therefore, it makes value and smooth circulation of the foreign currency money to increase and improve in the present invention, and it can increase the effect of the foreign currency money.

(3) Since the IC cards, magnetic cards (prepaid card) and the like with information of converting value of the foreign currency can be issued to the user, the mailing is carried out easily at the side of the users, system management and card issuers.

Therefore, the effect of security by introducing the password number system is improved and achieved when the specific cards including IC cards and magnetic cards (prepaid card) and the like are used.

(4) It can record information for value of the conversion of the currency and the users in the specific cards including IC cards, magnetic cards, prepaid card and the like.

Therefore, it can improve the goods circulation and financial circulation to convert to gift cards and money that can be used by the specific card domestically and buy the commercial goods.

What is claimed is:

1. A system for converting foreign currency comprising:

means for receiving a foreign currency by means of delivering including a mailing, home delivery or delivery service in a condition that said foreign currency is put in a storage body including an envelope, case or box;

means for issuing a specific card including a magnetic card or IC card which saves points that corresponds to the amount of said foreign currency calculated according to a conversion rate at said foreign currency at a predetermined period; and a conversion shop having a conversion-clearing system, configured for purchasing a gift certificate and commercial goods and converting depending on said points of said specific card.

2. The system for converting foreign currency according to claim 1, further comprising:

means for collecting, having a collecting box which collects said storage body, the collecting box provided at shops, banks or other relative place.

3. The system for converting foreign currency according to claim 1 or 2, further comprising:

means for confirming information of users including name are address.

* * * * *